United States Patent Office 2,698,308
Patented Dec. 28, 1954

2,698,308

EPOXIDE ESTERS

Samuel B. Crecelius, Washington, D. C., assignor to Devoe & Raynolds Company, Inc., Louisville, Ky., a corporation of New York No Drawing. Application December 4, 1950, Serial No. 199,161

9 Claims. (Cl. 260—18)

This invention relates to epoxide esters and more particularly to esters of epoxide alcohols which are esterified at the hydroxyl groups and still contain epoxide groups. The invention includes an improved method for the production of such epoxide esters, the epoxide esters so produced, and compositions containing them or made therefrom.

The epoxide alcohols which are esterified to produce the new epoxide esters are alcohols which contain terminal epoxide or glycidyl groups as well as intermediate esterifiable hydroxyl groups and which are produced from dihydric phenols by reaction with epichlorhydrin and caustic alkali or by the reaction of dihydric phenols with diepoxides to produce polyether derivatives of the dihydric phenol having terminal aliphatic epoxide groups. Such polyhydric alcohols containing terminal epoxide groups are epoxide resins and in general are polymeric products.

The epoxide esters are made from such epoxide alcohols by alcoholysis reaction with simple esters of the drying oil or other acids with readily volatile alcohols which are volatilized during the alcoholysis reaction. Esterification in this way brings about reaction between hydroxyl groups of the epoxide alcohol while leaving the epoxide groups in the epoxide ester product.

The epoxide resins which are advantageously used as the epoxide alcohols to produce the new epoxide esters are prepared by reacting a dihydric phenol with epichlorhydrin in alkaline solution. These products are in general of a resinous character and are glycidyl ethers of the dihydric phenols. Various dihydric phenols can be used in preparing these glycidyl ethers including mononuclear phenols such as resorcinol, etc., or polynuclear phenols such as bisphenol (p,p'dihydroxydiphenyldimethyl methane) and other dihydroxydiaryldialkyl methanes, 1,5 dihydroxy naphthalene, etc.

The glycidyl ethers or epoxide resins are produced from the dihydric phenols by heating with epichlorhydrin in the presence of caustic alkali, using more than one mol of epichlorhydrin per mol of the dihydric phenol and up to around 2 mols of epichlorhydrin per mol of dihydric phenol and using an amount of caustic alkali somewhat in excess of that equivalent to the epichlorhydrin. The heating is continued to convert the product into a mixture of glycidyl ethers or epoxide ethers. The principal product may be represented by the following formula:

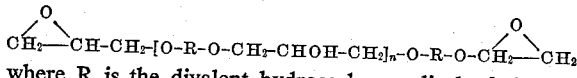

where R is the divalent hydrocarbon radical of the dihydric phenol, and n is 1, 2, 3, etc.

The length of the chain and the extent of polymerization can be varied by changing the molecular proportions of epichlorhydrin and dihydric phenol. By decreasing the molecular ratio of epichlorhydrin to dihydric phenol from 2 epichlorhydrin to 1 dihydric phenol towards a ratio of 1 epichlorhydrin to 1 dihydric phenol the molecular weight and the softening point of the epoxide resin or glycidyl ether is increased.

In general these epoxide ethers or glycidyl ethers contain terminal epoxide groups, and have alternating intermediate aliphatic hydroxyl-containing and aromatic nuclei linked through ether oxygen, and with terminal epoxide-containing aliphatic groups.

The polyhydric epoxide resins which are to be subjected to esterification also include the reaction products of dihydric phenols with diepoxides such as diglycide ether, butadiene diepoxide, and the diepoxides and polyepoxides resulting from the reaction of polyhydric alcohol such as glycerol, etc. with epichlorhydrin to produce polychlorhydrin ethers of the polyhydric alcohol and by dehydrogenation of the polychlorhydrin ethers, e. g., with sodium aluminate, as described in United States application Serial No. 754,080, filed June 11, 1947 (now Patent No. 2,538,072), such epoxide resins also containing alternating aromatic and aliphatic nuclei or groups united through ether oxygen.

The epoxide content or epoxide equivalent of the epoxide resins is determined for practical purposes by determining the equivalent weight of the composition per epoxide group. The method used for determining the epoxide content is by heating 1 gram sample of the epoxide resin with an excess of pyridine containing pyridine hydrochloride (made by adding 16 cc. of concentrated hydrochloric acid per liter of pyridine) at the boiling point for 20 minutes and back titrating the excess pyridine hydrochloride with O.1 N sodium hydroxide using phenolphthalein as indicator, and considering that 1 HCl is equivalent to 1 epoxide group.

In making the new epoxide esters from the epoxide resins, the resins are subjected to esterification by reaction with simple esters of the drying oil or other acids with the use of a catalyst to bring about an alcoholysis reaction between the hydroxyls of the resins and the simple esters, with removal of the alcohol of the simple ester. The simple esters used for esterification of the resins are advantageously esters of readily volatile alcohols such as the methyl esters of the drying oil acids. Simple esters of other readily volatile alcohols such as ethyl alcohol can also be used.

As catalysts for promoting the reaction of alcoholysis between the simple esters and the polyhydric epoxide resins are included alkaline catalysts such as sodium methoxide or other alkali alkoxides, and acetates such as sodium acetate, potassium acetate, calcium acetate, etc.

I have found that by subjecting the polyhydric alcohols with terminal epoxide groups to reaction with such simple esters, e. g., methyl esters of the drying oil acids, the esterification reaction will take place with the hydroxyl groups of the epoxide resin leaving the terminal epoxide groups unreacted, thus forming epoxide esters which contain the free terminal epoxide groups of the epoxide resins and with the esterification of the alcoholic hydroxyl groups of the resin. By using an equivalent amount of simple drying oil esters for reaction with the free hydroxyls of the resin, more or less complete reaction of the hydroxyl groups of the resin to form drying oil esters will take place without any considerable reaction of the esters with the terminal epoxide groups.

The simple esters of higher unsaturated fatty acids such as drying oil acids are advantageously used to produce epoxide esters having drying properties as well as the property of further reaction through epoxide groups. Thus, the epoxide resins of drying oil acids can readily be prepared which are capable of hardening both through oxidation or polymerization of the unsaturated ester groups and by reaction of epoxide groups with other reactive groups of the esters, with the use of a suitable catalyst.

The alcoholysis reaction of the simple esters of drying oil acids with the epoxide resins can be carried out at a temperature at which there is little or no polymerization of the drying oil acids.

The invention also includes the production of modified epoxide esters in which, in addition to the drying oil acids, there may also be used other acids such as small amounts of rosin acids, or small amounts of dibasic acids such as phthalic acid, which are also combined in the form of esters etc. The simple esters of dimeric unsaturated acids can also be used for the esterification.

In its broader aspects the invention includes the esterification of the epoxide resins with saturated higher fatty acids to produce epoxide resins which are still capable of reaction through epoxide groups.

The invention will be further illustrated by the following specific examples, but it will be understood that the invention is not limited thereto.

*Example 1.*—The epoxide resin used was produced by the reaction of about 4 mols of bisphenol and 5 mols of epichlorhydrin with an excess of aqueous caustic alkali and had a melting point of 95–105° C. and an equivalent weight to epoxide of 875–975. A mixture of 400 parts of the epoxide resin, 295 parts of the methyl esters of China-wood oil acids and 0.5 part of calcium acetate was heated with continuous agitation for 1 hour and 45 minutes at 160–195° C. at 2 mm. pressure to give a homogeneous product which was soluble in ketone and aromatic solvents. The solid product produced had an epoxide equivalent weight of 1660.

A solution of this product in methyl isobutyl ketone treated with 2% of its weight of butylamine-boron trifluoride addition compound as a catalyst gave thin films which when baked at 150° C. for 20 minutes gave hard, tough products.

Hard, tough films were likewise produced when the butylamine-boron trifluoride catalyst was replaced by 1% of the phenyl hydrazine-boron trifluoride addition product by baking for 20 minutes at 150° C. or by allowing to air-dry at room temperature for 12 hours.

The above product represents a 41% China-wood oil modified product.

*Example 2.*—The epoxide resin used was produced from bisphenol and epichlorhydrin with the use of aqueous caustic alkali and had a melting point of 125–135° C. and an equivalent weight to epoxide of 1500–2100. A mixture of 400 parts of this epoxide resin, 100 parts of the methyl esters of China-wood oil acids and 0.5 part of sodium methoxide was heated for 3 hours at 150–160° C. at a pressure of 2 mm. to give a low oil modified product (about 19.2% China-wood oil modified) which was dissolved in a mixture of 400 parts of methyl isobutyl ketone and 100 parts of xylene. The product when treated with catalysts such as boron-trifluoride addition compounds gives an air-dry or baking varnish.

*Example 3.*—A mixture of 400 parts of the same resin used in Example 1, 295 parts of the methyl esters of linseed oil acids, and 0.5 part of sodium methoxide was heated for 4 hours at 150° C. at a pressure of 4 mm. to give a product having an equivalent weight to epoxide of 1580. The methyl alcohol recovered in a cold condenser corresponded to 100% of the theoretical amount.

This product when thinned with aromatic or ketone solvents and treated with 2% of its weight of butylamine-boron trifluoride addition compound or with 1% of phenyl hydrazine-boron trifluoride addition product, gave varnishes which when spread in thin films and baked for 1 hour at 150° C. gave hard, tough conversion products. The product of this example represents about 41% linseed modified product.

*Example 4.*—A product of about 19.2% linseed oil modification was produced by heating a mixture of 400 parts of the epoxide resin of Example 1, 100 parts of the methyl esters of linseed oil acids, and 0.5 part of sodium methoxide for 5 hours at 150° C. and 1 hour from 150 up to 280° C. to give a product having an epoxide equivalent of 1023.

A methyl isobutyl ketone solution of this product treated with 3% of its solids weight of phenyl hydrazine-boron trifluoride addition product gave a varnish which when spread in films of 0.003 inch wet thickness and baked for 1 hour at 90° C. gave hard, tough, mar-proof products.

*Example 5.*—400 parts of the same epoxide resin used in Example 1, 100 parts of methyl esters of dehydrated castor oil acids and 0.5 part of sodium methoxide were heated for 3 hours and 30 minutes at a pressure of 3–5 mm. to give a product having an epoxide equivalent of 1395. The amount of methyl alcohol recovered in the condenser corresponded to 100% of the theoretical amount.

This product was thinned with methyl isobutyl ketone and treated with 3% of its weight of phenyl hydrazine-boron trifluoride addition complex to give a varnish which when spread in 0.003 inch wet thickness and baked 1 hour at 90° C. gave very hard, tough, mar-free films.

*Example 6.*—A mixture of 400 parts of the epoxide resin of Example 1, 100 parts of the methyl esters of soya bean oil acids, and 0.5 part of sodium methoxide, was heated for 4 hours at 150° C. at a pressure of 3 mm. to give a product having an epoxide equivalent of 1185.

The amount of methyl alcohol recovered in the condenser corresponded to 100% of the theoretical amount. A solution of this product in methyl isobutyl ketone and treated with 3% of the solids weight of phenyl hydrazine-boron trifluoride addition product gave a varnish which when spread in 0.003 inch wet films gave hard, tough, products when air-dried for 12 hours.

The same product treated with 3% aniline-boron trifluoride addition compound gave hard, tough films on baking for 1 hour at 90° C.

*Example 7.*—A mixture of 400 parts of the epoxide resin referred to in Example 1, 100 parts of methyl stearate and 0.5 part of sodium methoxide was heated for 3 hours and 45 minutes at 150–160° C. and then heated rapidly to 290° C. over a period of 15 minutes, while maintaining a pressure of 3 mm. and the product was then allowed to cool. The product had an epoxide content of 1275.

The product was dissolved in a mixture of 400 parts of methyl isobutyl ketone, 100 parts of xylene and treated with 0.03% of a cobalt drier, based on solids, to give a varnish which became hard and tough when a thin film of 0.003 inch wet thickness was air-dried for 18 hours.

A hard, tough film was obtained when this varnish was baked for 1 hour at 90° C. using 3% phenyl hydrazine-boron trifluoride addition complex on the solids as a catalyst or converting agent.

*Example 8.*—A mixture of 191 parts of the same resin referred to in Example 1, 59 parts of methyl caprate and 0.3 part sodium methoxide was heated to 178° C. at atmospheric pressure over a period of 5 hours and held at 170–189° C. for 2 hours and 45 minutes. After the mixture was cooled the temperature was again raised to 170° C. at a pressure of 2 mm. to complete the reaction and remove any unreacted methyl caprate, holding the temperature at 170–175° C. for 2 hours and 15 minutes at this pressure.

The product had an epoxide equivalent of 1550 and when reduced to 50% solids in a solvent mixture of methyl isobutyl ketone and 1 part of xylene had a viscosity of N (bubble viscosimeter).

*Example 9.*—A mixture of 400 parts of the same epoxide resin used in Example 1, 100 parts of methyl abietate, and 0.5 part sodium methoxide was heated under a pressure of 20 mm. at about 150° C. for about 8 hours, then at 280° C. for 15 minutes and cooled for 15 minutes to 200° C. The product had an epoxide value of 1605.

A solution of this product in a mixture of 400 parts of hexone and 100 parts of xylene with 3% of phenyl hydrazine-boron trifluoride addition product, based on the solids weight, was applied as a film of 0.003 inch wet thickness and baked for 1 hour at 90° C. to give a hard, tough film.

*Example 10.*—The resin used was an epoxide resin resulting from the reaction of 1 mol of bisphenol and 2 mols of epichlorhydrin in the presence of aqueous caustic alkali and having a melting point of around 43 to 45° C. A mixture of 400 parts of this epoxide resin, 27.0 parts of dibutyl sebacate, and 0.5 part sodium methylate were heated for 5 hours under a pressure of 3 mm. at a temperature of 150–160° C. and 180–200° C. for 2 hours, to give a product having an epoxide equivalent of 322.

A mixture of 400 parts of the same epoxide resin, 53.5 parts of dibutyl sebacate and 0.5 part of sodium methylate was heated for 2¾ hours at 145–160° C. at 3 mm. pressure and for 1½ hours at 200° C. to give an epoxide ester product having an epoxide equivalent of 335.

*Example 11.*—A mixture of 450 parts of the same resin as in the preceding example, melting at 43–45° C., 16 parts of triethyl citrate and 0.5 part of sodium methylate was heated for 5¼ hours at 150° C. with gradual decrease of the pressure to 3 mm., to give a product having an epoxide equivalent of 308.5.

A mixture of 450 parts of a similar resin having a melting point of around 50° C. with 16 parts of triethylamine and 0.5 part of sodium methylate was similarly heated for 4¼ hours at about 152° C. with gradual decrease of the pressure to 3 mm. and with heating to 200° C. at the end to form the epoxide ester. A 50% solution in dioxane with the addition of 3% acetic anhydride-boron trifluoride addition complex as an epoxide conversion catalyst gave a hard, tough film on heating for 20 minutes at 90° C.

*Example 12.*—A mixture of 450 parts of an epoxide resin resulting from the reaction of 1 mol of bisphenol and 2 mols of epichlorhydrin in the presence of aqueous caustic alkali and having a melting point of about 50° C. with 50 parts of dimeric soya methyl esters, and 0.5 part sodium methylate, was heated for about 4½ hours at a temperature of about 150° C. and a pressure of 1 mm. The resulting epoxide ester was dissolved in hexone to form a 50% solution, 3% acetic anhydride-boron trifluoride catalyst was added and the resulting film was applied and dried overnight at 55° C. to form a hard, tough film.

A similar mixture, made with the use of an epoxide resin having a melting point of around 43 to 45° C. was heated for 5¾ hours at 150° C. and 3 mm. followed by heating for ¾ hour at 200°. The resulting product was thinned with hexone to form a 50% solution, 3% acetic anhydride-boron trifluoride addition complex was added as an epoxide catalyst and the solution was applied as a film which was baked for 20 minutes at 90° C.

Example 13.—A mixture of 400 parts of the same resin used in Example 12 having a melting point of about 50° C., 30 parts of dimethylphthalate and 0.5 part sodium methylate was heated for 2¾ hours at 150° C. with the pressure gradually decreasing to 3 mm. The resulting epoxide ester was dissolved in dioxane to form a 50% solution, 3% of the acetic anhydride-boron trifluoride addition complex added and the film applied and baked for 20 minutes at 90° C. to form a hard, tough film.

Example 14.—A mixture of 400 parts of an epoxide resin such as described in Example 10, having a melting point of around 43–45° C., 12.5 parts of diethyl oxalate, and 0.5 part sodium methylate was heated for 10 hours at a temperature of 150 with the pressure maintained at atmospheric for 7½ hours then reduced to 3 mm. and heated at 200° C. for 3½ hours. The resulting epoxide ester had an epoxide equivalent of 1269.

A similar mixture of 400 parts of the same resin with 25 parts of diethyl oxalate and 0.5 part sodium methylate, was heated for about 9 hours at a temperature of 150–180° C. with the pressure being gradually reduced to 4 mm. followed by heating for 4 hours at 200° C. The resulting epoxide resin had an epoxide equivalent of 615.

In a similar manner other epoxide esters can be produced by subjecting the same or other epoxide resins containing both hydroxyl and epoxide groups with esterification by alcoholysis with the use of the methyl esters of the acids.

The epoxide esters produced from drying oil acids have the advantage that they produce films which can harden in part through the unsaturated ester groups and in part through reaction of epoxide groups with other reactive groups. The improved alcoholysis process of the present invention has the advantage that it enables esters of drying oils to be produced at relatively low temperatures at which heat bodying of the unsaturated ester groups is minimized.

Epoxide esters made with saturated acids such as stearic acid, etc. do not have drying properties similar to those of the esters made with drying oil acids but can nevertheless be hardened through reaction of epoxide groups with other reactive groups in the presence of a suitable catalyst.

Where the acids used for esterification are dibasic acids they are capable of reacting with different hydroxyl groups which may be on the same or different epoxide resin molecules. Where the esterification reaction results in cross-linking of the epoxide resin molecules through dibasic acids, products of special properties are obtained which can further react through such ester groups.

The extent to which the esterifiable hydroxyl groups of the epoxide alcohols are esterified can be varied but in general at least one hydroxyl group of the epoxide resin will be esterified and advantageously all or practically all of the esterifiable hydroxyl groups can be esterified. Where the esters are partial esters in the sense that only part of the esterifiable hydroxyl groups are esterified and there remains one or more free hydroxyl groups, these are capable of reacting with epoxide groups to form more complex and larger molecular weight reaction products.

I claim:
1. The process of producing organic carboxylic acid esters of resinous epoxide alcohols which comprises heating to an alcoholysis temperature resinous epoxide alcohols which are polyether derivatives of dihydric phenols having alternating aliphatic groups and aromatic nuclei united through ether oxygen, including intermediate alcoholic hydroxyl-containing and terminal epoxide-containing aliphatic groups, with organic carboxylic acid esters of readily volatile monohydric alcohols under a high vacuum with volatilization and removal of the monohydric alcohol in the presence of a small amount of an alkaline alcoholysis catalyst, whereby selective esterification is effected of hydroxyl groups of the resinous epoxy alcohol to produce esters containing epoxide groups.

2. The process according to claim 1 in which the resinous epoxide alcohols esterified are glycidyl ethers of dihydric phenols.

3. The process according to claim 1 in which drying oil acid esters of monohydric alcohols are used to produce epoxide esters esterified with drying oil acids.

4. The process of producing organic carboxylic acid esters of resinous epoxide alcohols which comprises heating to an alcoholysis temperature an epoxide alcohol which is a glycide ether of bisphenol, resulting from the reaction of epichlorhydrin and bisphenol in the presence of aqueous alkali, with an organic carboxylic acid ester of a readily volatile monohydric alcohol under a high vacuum and in the presence of an alkaline alcoholysis catalyst, to effect removal of the volatile alcohol, whereby esters of the resinous epoxide alcohol are obtained containing epoxide groups.

5. The process according to claim 4 in which the esters of the monohydric alcohols include esters of drying oil acids.

6. Organic carboxylic acid esters of resinous epoxide alcohols which are polyether derivatives of dihydric phenols having alternating aliphatic groups and aromatic nuclei united through ether oxygen, including intermediate alcoholic hydroxyl-containing and terminal epoxide-containing aliphatic groups, said epoxide alcohols having been transesterified with alkyl carboxylic acid esters and having terminal epoxide groups.

7. Organic carboxylic acid esters of resinous epoxide alcohols which are polyether derivatives of bisphenol having alternating aliphatic groups and 4,4'-diphenyldimethyl methane nuclei united through ether oxygen, including intermediate alcoholic hydroxyl-containing and terminal epoxide-containing aliphatic groups, said epoxide alcohols having been transesterified with alkyl carboxylic acid esters and having terminal epoxide groups.

8. Esters as defined in claim 6 in which the epoxide alcohols having been transesterified with alkyl drying oil acid esters.

9. Esters as defined in claim 7 in which the epoxide alcohols having been transesterified with alkyl drying oil acid esters.

References Cited in the file of this patent

UNITED STATES PATENTS

| Number | Name | Date |
|---|---|---|
| 2,476,922 | Shokal et al. | July 19, 1949 |
| 2,504,518 | Greenlee | Apr. 18, 1950 |
| 2,524,432 | Dorough | Oct. 3, 1950 |
| 2,541,027 | Bradley | Feb. 13, 1951 |
| 2,559,347 | Dannenberg | July 3, 1951 |

OTHER REFERENCES

Markley, Fatty Acids, pages 293–296, pub. 1937 by Interscience Pub., N. Y.